United States Patent Office 2,769,815
Patented Nov. 6, 1956

2,769,815

REPLACEMENT OF BROMINE BY CHLORINE IN AROMATIC COMPOUNDS

William B. Hardy, Bound Brook, and Robert B. Fortenbaugh, Gladstone, N. J., assignors to American Cyanamid Company, New York, N. Y., a corporation of Maine No Drawing. Application April 14, 1953,
Serial No. 348,834

19 Claims. (Cl. 260—325)

This invention relates to a process of replacing bromine by chlorine in aromatic compounds.

While it is very simple to replace one halogen for another in the aliphatic series, direct replacement has generally not been possible in the aromatic series except for a few compounds in which the halogen is very strongly activated by the presence of other negative groups. Examples of such compounds are 2,4-dinitrohalobenzene and ortho-nitrohalobenzene. This has left a distinct gap in the procedures available to the organic chemist to produce certain desired aromatic chloro compounds. In many cases it is a comparatively simple matter to produce the corresponding bromo compounds either by direct bromination or by producing a bromo substituted intermediate which is then further reacted. In many cases the corresponding chloro compound cannot be produced directly and where it can be made at all requires roundabout multi-step processes with resulting sharp increases in cost. In many such cases the direct chlorination produces a mixture of mono and polychloro compounds which present separation problems and result in lowered yields. Among typical compounds which are of practical importance but cannot be readily produced by direct chlorination is 1-amino-2-chloroanthraquinone, 2-amino-3-chloroanthraquinone, Bz-1-chlorobenzanthrone and the like. The corresponding bromo derivatives are readily obtainable by direct bromination, but have not been transformable into the corresponding chloro compounds by any practical processes hitherto. As a result, some of these important compounds have been produced only by roundabout routes with resulting increase in cost.

The present invention involves a simple process whereby a bromo aromatic compound is transformed in excellent yield into the corresponding chloro compound. The process involves heating with cuprous chloride and a material capable of complex formation with copper. Their reaction requires a reasonably fluid medium and so in the case of some complexing compounds, such as ammonia, requires the presence of an inert organic liquid as a reaction solvent or diluent. By inert is meant that the liquid does not interfere with the reaction. Many of the compounds capable of complex formation with cuprous chloride, such as the tertiary heterocyclic amines are also liquids, and may be used in excess to constitute the solvent or diluent in the reaction medium. While these liquids take part in the reaction, they do not interfere with it and are therefore equivalent for the purposes of the present process to liquids which are completely inert. Obviously, of course, a mixture of the complexing liquid compound and an inert or non-reactive liquid may be used.

The present process is generally applicable to bromo aromatic compounds and includes bromo compounds of the benzene, naphthalene, anthracene, diphenyl, polyphenyl, benzanthrone, pyranthrene, indanthrone, dibenzanthrone, pyrene and other series. Bromo compounds of various heterocyclic series, such as pyridine, quinoline, quinazoline, pyrazine, acridone, thioxanthone, carbazole, anthrapyrimidine, thiazole, oxazole are also usable. The presence of substitutents which do not react with cuprous chloride, of course does not adversely affect the process of the present invention; in fact, some of the most important practical compounds which can be readily produced by the process of the present invention do involve aromatic compounds having other substituents than bromine. Typical of these other substituents are chlorine, acyl-amino, amino and nitro groups. In some cases, notably in the case of the nitro group, these substitutents will activate the bromine to be replaced making the reaction easier to carry out. In other words, the present process is applicable not only to such substitutions of chlorine and bromine which could not be effected at all by other means, but also to the substitution of bromine by chlorine in compounds where the bromine has been activated by other negative groups and other methods of substitution are possible. Even there the present process with its smooth operation and high yield may present an important improvement, though of course the improvement will not normally be as great as in the case of the bromo compounds which do not permit substitution at all by other means.

The complexing agents to be used are in general basic, such as tertiary heterocyclic bases, for example, pyridine and its homologs, dialkylanilines, trialkylamines, primary and secondary alkyl and aralkylamines, ammonia, etc. Similarly, N,N-dialkylamides such as dimethylcyanamide, dimethylformamide, etc. can be used. Another class are quaternary ammonium chloride compounds such as tetramethyl ammonium chloride, methyl triethyl ammonium chloride, dihexadecyl dimethyl ammonium chloride, dodecyl trimethyl ammonium chloride, phenyl trimethyl ammonium chloride, diphenyl diethyl ammonium chloride, phenyl dodecyl dimethyl ammonium chloride, 2-pyridyl trimethyl ammonium chloride, and 2-thienyl trimethyl ammonium chloride, dodecyl pyridinium chloride, methyl quinolinium chloride. Acylamido alkyl quaternary ammonium chloride compounds may also be used such as stearamidopropyl trimethyl ammonium chloride, or stearamidopropyl hydroxyethyl dimethyl ammonium chloride. In addition, certain nitriles will also complex with copper, such as for example benzylcyanide, benzonitrile and the like. All of the above complexing agents are nitrogen-containing compounds and form complexes with cuprous ions. Thus, generically, they are nitrogen-containing, cuprous ion complexing agents and are so used in the practice of this invention.

In addition to the liquid complexing compounds which can be used in excess as solvents, such inert or nonreactive solvents are benzene and its homologs, naphthalene and its homologs, diphenyl and its homologs, chlorinated and nitrated derivatives, dioxane, glycol, etc. may be used.

It is an advantage of the present invention that the temperature to be used is not critical. It does, however, have a practical lower limit of 75° C. below which the amount of reaction is not suitable. For example, at 73° C. the yield in a typical case drops below 10%. At 100° C. yields approach theoretical. In general, for each of the compounds optimum temperatures will differ slightly but no exact temperature is necessary to get good results and so control of the reaction as far as temperature is concerned, requires no extraordinary precautions which is a practical advantage of the invention.

Another practical operating advantage of the present process is that the cuprous chloride need not be chemically pure. An ordinary technical grade reacts satisfactorily permitting nearly quantitative yields. This reduces the cost of the process as the technical grade is considerably cheaper than the completely pure compound. It has been observed, however, that free metallic copper causes elimination of the bromine atom in preference to its substitution by chlorine. Since some grades of technical cuprous chloride contain appreciable amounts (up to 5%) of free copper, in such cases it is desirable to add to the technical cuprous chloride sufficient cupric chloride to convert substantially all free copper into cuprous chloride. Any unchanged cupric chloride is without effect on the reaction.

In general, the cuprous chloride is used in substantially stoichiometrical proportions. An excess of course does no harm but is not in general required. As far as the actual manipulative operations are concerned, the process of the present invention operates smoothly and requires only moderate agitation. The reaction is of course by no means instantaneous and in each case the heating and stirring will continue until the reaction is substantially complete. This will vary somewhat with the different compounds and of course as in ordinary chemical engineering practice with the size of the batch.

The invention will be illustrated in the following specific examples, the parts being by weight unless otherwise specified.

EXAMPLE 1

*2-acetylamino-3-chloroanthraquinone*

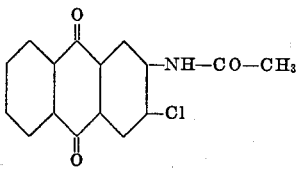

A mixture of 5 parts of 2-acetylamino-3-bromoanthraquinone, 3 parts of cuprous chloride, and 100 parts by volume of alpha-picoline is stirred at 100° C. until the reaction is substantially complete. The mixture is then cooled and filtered at room temperature. The product is washed with water and with ammonia and dried. It is principally 2-acetylamino-3-chloro anthraquinone.

When the procedure of the example is repeated at 73° C. instead of 100° C. and the reaction temperature maintained until substantially no further reaction takes place, which is of the order of magnitude of 24 hours, 91.5% of the original 2-acetylamino-3-bromoanthraquinone remains unreacted.

EXAMPLE 2

*2-acetylamino-3-chloroanthraquinone*

A mixture of 10 parts of 2-acetylamino-3-bromoanthraquinone, 6.5 parts of cuprous chloride and 200 parts by volume of pyridine is stirred at 105° C. until the reaction is substantially complete. The pyridine is removed by steam distillation. The product is isolated by filtration and washing and is found to be principally 2-acetylamino-3-chloroanthraquinone.

EXAMPLE 3

*2-acetylamino-3-chloroanthraquinone*

A mixture of 100 parts of 2-acetylamino-3-bromoanthraquinone, 70 parts of cuprous chloride, 1,000 parts by volume of ntirobenzene, and 50 parts by volume of pyridine is stirred at 155° C. until the reaction is substantially complete. The solvents are removed by steam distillation. The precipitated product is isolated by filtration and washing, and is found to be principally 2-acetylamino-3-chloroanthraquinone.

EXAMPLE 4

*2-acetylamino-3-chloroanthraquinone*

A mixture of 5 parts of dimethyl formamide, 10 parts of 2-acetylamino-3-bromoanthraquinone, 6 parts of cuprous chloride, and 250 parts by volume of chlorobenzene is stirred at 130° C. until the reaction is substantially complete. The reaction mixture is cooled. The product is isolated by filtration and washing and is found to be principally 2-acetylamino-3-chloroanthraquinone.

EXAMPLE 5

*2-acetylamino-3-chloroanthraquinone*

A mixture of 200 parts by volume of chlorbenzene, 10 parts of 2-acetylamino-3-bromoanthraquinone, 7 parts of cuprous chloride and 10 parts by volume of dimethyl cyanamide is stirred at 110° C. until the reaction is substantially complete. The solvents are then removed by steam stripping. The product is isolated by filtration, washed with ammonia, and then with hydrochloric acid until all the cuprous salts are removed. It is principally 2-acetylamino-3-chloroanthraquinone.

EXAMPLE 6

*2-acetylamino-3-chloroanthraquinone*

A mixture of 6 parts of cuprous chloride, 10 parts of 2-acetylamino-3-bromoanthraquinone and 200 parts by volume of 2-methyl-5-ethylpyridine is stirred at 163° C. until the reaction is substantially complete. The reaction mixture is then chilled at 10° C. and filtered. The product is washed and dried. It is principally 2-acetylamino-3-chloroanthraquinone.

EXAMPLE 7

*2-acetylamino-3-chloroanthraquinone*

8.9 parts of beta-aminoanthraquinone are slurried in 50 parts by volume of nitrobenzene and the slurry is heated to 70° C. 6.1 parts of bromine are added gradually at 70–80° C. The mixture is then heated to 180° C. until bromination is complete. It is then allowed to cool to room temperature and 1.8 parts by volume of pyridine are added, followed by 4.3 parts by volume of acetyl chloride, added gradually. The reaction mixture is heated to 170° C. until acetylation is complete. It is then cooled and the reaction byproducts are flushed out by a stream of inert gas, such as nitrogen. The reaction mixture is then diluted with 50 parts by volume of nitrobenzene and 7 parts of pyridine. 9.8 parts of cuprous chloride are added and the mixture is stirred at 155° C. until the reaction is substantially complete. The mixture is cooled to room temperature and the reaction product is isolated by filtration and washing. It is principally 2-acetylamino-3-chloroanthraquinone.

EXAMPLE 8

*Bz-1-chlorbenzanthrone*

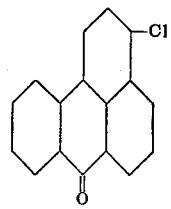

A mixture of 9 parts of Bz-1-bromobenzathrone, 9 parts of cuprous chloride, and 200 parts by volume of alpha-picoline is stirred at reflux until the reaction is substantially complete. The reaction mixture is drowned on ice and acidified with hydrochloric acid. The reaction product is isolated by filtration and washing. Analysis shows the product to be essentially Bz-1-chlorbenzanthrone.

EXAMPLE 9

*Chlorbenzene*

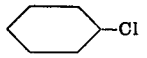

24 parts of bromobenzene, 30 parts of cuprous chloride, and 250 parts by volume of alpha-picoline are heated at 200° C. in an autoclave until the reaction is substantially complete. The reaction mixture is drowned in dilute hydrochloric acid and steam stripped. The oil which steam distills is isolated and dried. It is found on analysis to be essentially chlorbenzine, which can be purified by fractional distillation.

EXAMPLE 10

*Chlorobromopyranthrone*

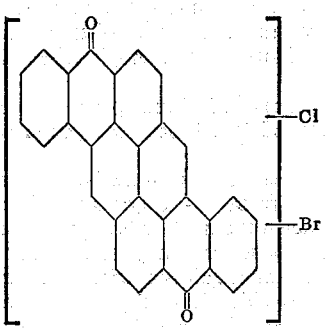

A mixture of 10 parts of cuprous chloride, 5.6 parts of dibromo pyranthrone, and 200 parts by volume of alpha-picoline is stirred at 130° C. until the reaction is substantially complete. The solvents are then removed by steam stripping and the product is isolated by filtration and washing. It is found on analysis to be chlorobromopyranthrone.

EXAMPLE 11

*Alpha-chloronaphthalene*

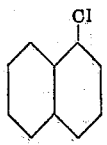

10 parts of alpha-bromonaphthalene, 10 parts of cuprous chloride, and 250 parts by volume of alpha-picoline are stirred at reflux until the reaction is substantially complete. The reaction mixture is drowned in dilute hydrochloric acid and steam stripped. The oil which steam distills is isolated and dried. It is found on analysis to be alpha-chloronaphthalene.

EXAMPLE 12

*Beta-chloronaphthalene*

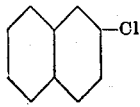

A mixture of 5 parts of beta-bromonaphthalene, 10 parts of cuprous chloride, and 250 parts by volume of alpha-picoline is stirred at reflux until the reaction is substantially complete. The reaction mixture was then drowned in dilute hydrochloric acid and the precipitated product is isolated by filtration. Beta-chloronaphthalene can be isolated from the product by recrystallization.

EXAMPLE 13

*5-chloroisatin*

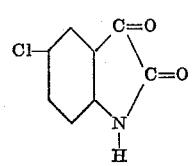

A mixture of 10 parts of 5-bromoisatin, 200 parts by volume of alpha-picoline and 10 parts of cuprous chloride is stirred at reflux until the reaction is substantially complete. The reaction mixture is then drowned on ice and acidified with hydrochloric acid. The product is isolated by filtration and washing. By recrystallization from solvent, such as acetone, 5-chloroisatin can be isolated.

EXAMPLE 14

*1-chloro-3-bromoanthraquinone*

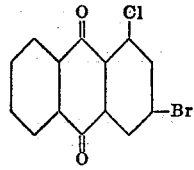

A mixture of 11 parts of 1,3-dibromoanthraquinone, 12 parts of cuprous chloride, and 200 parts by volume of alpha-picoline is stirred at reflux until the reaction is substantially complete. The reaction mixture is drowned on ice, acidified with hydrochloric acid, and the product isolated by filtration and washing. Analysis indicates that the product is essentially a chlorobromoanthraquinone, probably the 1-chloro-3-bromo isomer, but that some elimination of halogen has also occurred.

EXAMPLE 15

*2-chloro-6-bromoanthraquinone*

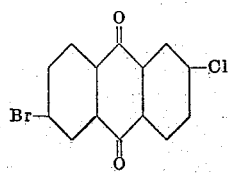

A mixture of 5.8 parts of 2,6-dibromoanthraquinone, 6 parts of cuprous chloride, and 100 parts by volume of alpha-picoline is stirred at reflux until the reaction is substantially complete. The reaction mixture is drowned on ice and acidified with hydrochloric acid. The product is isolated by filtration and washing. Analysis indicates that just about half the starting bromine has been replaced, giving principally a chlorobromoanthraquinone.

EXAMPLE 16

*1-amino-3-chloroanthraquinone*

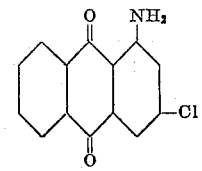

A mixture of 5 parts of 1-amino-3-bromoanthraquinone, 5 parts of cuprous chloride, and 200 parts by volume of alpha-picoline is stirred at reflux until the reaction is substantially complete. The reaction mixture is drowned on ice and acidified with hydrochloric acid. The product is isolated by filtration and washing. 1-amino-3-chloroanthraquinone can be isolated from this product by recrystallization.

EXAMPLE 17

*1-p-toluenesulfonamido-3-chloroanthraquinone and 1-amino-3-chloroanthraquinone*

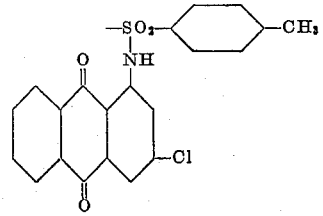

A mixture of 4 parts of 1-p-toluenesulfonamido-3-bromoanthraquinone, 2.25 parts of cuprous chloride, 5 parts of dimethylsulfanilic acid sodium salt, and 200 parts by volume of chlorbenzene is stirred at about 130° C. until the reaction is substantially complete. The solvents are removed by steam stripping, and the solid products are isolated by filtration. The crude 1-tosylamino-3-chloroanthraquinone can be hydrolyzed directly in concentrated sulfuric acid solution. The mixture, after being held at 60° C. for a short time, is drowned. The drowned product can be filtered and washed to give 1-amino-3-chloroanthraquinone, which can be purified by recrystallization.

EXAMPLE 18

A mixture of 10 parts of 2-acetylamino-3-bromoanthraquinone and 6 parts of cuprous chloride is added to 200 parts of chlorobenzene being stirred under nitrogen, followed by 18 parts of methyl triethyl ammonium chloride. The mixture is stirred at 130° C. until the reaction is substantially complete. The mixture is cooled to room temperature and filtered. The product is washed with benzene, followed successively by dilute hydrochloric acid, water, ammonium hydroxide, and water. The product is substantially 2-acetylamino-3-chloroanthraquinone.

A similar reaction, in which the methyl triethyl ammonium chloride is omitted showed only 8% conversion to the chloro compound.

We claim:

1. A process of replacing nuclear bromine by chlorine in aromatic bromo compounds which comprises heating the aromatic bromo compound with at least one equivalent of cuprous chloride in the presence of a nitrogen-containing cuprous ion complexing agent to a temperature of at least 75° C. and recovering the aromatic chloro compound so obtained.

2. The process of claim 1 wherein said complexing agent is a tertiary nitrogen-containing heterocyclic base.

3. The process of claim 2 wherein said tertiary heterocyclic base is pyridine.

4. The process of claim 2 wherein said tertiary heterocyclic base is alpha-picoline.

5. The process of claim 1 wherein said complexing agent is a di-alkyl amide.

6. The process of claim 5 wherein said di-alkyl amide is dimethyl formamide.

7. The process of claim 5 wherein said di-alkyl amide is dimethyl cyanamide.

8. The process of claim 1 wherein said complexing agent is a quaternary ammonium chloride.

9. The process of claim 8 wherein said quaternary ammonium chloride is methyl tri-ethyl ammonium chloride.

10. The process of claim 1 wherein said aromatic bromo compound is a bromo compound of the anthraquinone series.

11. As a process of preparing 2-acetylamino-3-chloroanthraquinone from 2 - acetylamino-3-bromoanthraquinone by replacing the nuclear bromine thereof with chlorine, the process which comprises heating the 2-acetylamino-3-bromoanthraquinone with at least one equivalent of cuprous chloride in the presence of a nitrogen-containing, cuprous ion complexing agent to a temperature of at least 75° C. and recovering the 2-acetylamino-3-chloroanthraquinone so obtained.

12. The process of claim 1 wherein said aromatic bromo compound is a polynuclear aromatic bromo compound.

13. The process of claim 12 wherein the polynuclear compound is a bromonapthalene.

14. The process of claim 1 wherein said aromatic bromo compound is a bromopyranthrone.

15. The process of claim 14 wherein the pyranthrone compound is dibromopyranthrone.

16. The process of claim 1 wherein said aromatic bromo compound is a bromobenzanthrone.

17. The process of claim 16 wherein the bromobenzanthrone compound is Bz-1-bromobenzanthrone.

18. The process of claim 1 wherein said aromatic bromo compound is a bromo-isatin.

19. The process of claim 18 wherein the bromo-isatin is 5-bromo-isatin.

References Cited in the file of this patent

Bunnett et al.: Chem. Reviews, vol. 49, pp. 392–95, Mar. 3, 1951.